United States Patent
Gross et al.

(10) Patent No.: US 11,287,814 B2
(45) Date of Patent: Mar. 29, 2022

(54) LANE CHANGE DETECTION SYSTEM AND METHOD FOR AN AUTONOMOUS VEHICLE

(71) Applicant: GM GLOBAL TECHNOLOGY OPERATIONS LLC, Detroit, MI (US)

(72) Inventors: Drew Gross, San Francisco, CA (US); Shiva Ghose, Berkeley, CA (US); Sohrab Haghighat, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 16/057,162

(22) Filed: Aug. 7, 2018

(65) Prior Publication Data
US 2020/0050195 A1    Feb. 13, 2020

(51) Int. Cl.
| | |
|---|---|
| G05D 1/00 | (2006.01) |
| G05D 1/02 | (2020.01) |
| B60W 30/18 | (2012.01) |
| B60W 10/08 | (2006.01) |
| B60W 10/06 | (2006.01) |
| B60W 10/20 | (2006.01) |

(52) U.S. Cl.
CPC ........... G05D 1/0088 (2013.01); B60W 10/06 (2013.01); B60W 10/08 (2013.01); B60W 10/20 (2013.01); B60W 30/18163 (2013.01); G05D 1/0214 (2013.01); G05D 1/0231 (2013.01); G05D 1/0242 (2013.01); G05D 1/0255 (2013.01); G05D 1/0257 (2013.01); G05D 1/0278 (2013.01); *B60W 2554/00* (2020.02); *G05D 2201/0213* (2013.01)

(58) Field of Classification Search
CPC .. G05D 1/0088; G05D 1/0214; G05D 1/0231; G05D 1/0242; G05D 1/0255; G05D 1/0257; G05D 1/0278; B60W 10/06; B60W 10/08; B60W 10/20; B60W 30/18163
See application file for complete search history.

(56) References Cited

U.S. PATENT DOCUMENTS

| | | |
|---|---|---|
| 9,625,910 B2 | 4/2017 | Choi et al. |
| 9,672,734 B1 | 6/2017 | Ratnasingam |
| 9,896,107 B1 | 2/2018 | Huang |
| 9,925,920 B2 | 3/2018 | Lei et al. |

(Continued)

*Primary Examiner* — Hunter B Lonsberry
*Assistant Examiner* — Daniel L Greene
(74) *Attorney, Agent, or Firm* — Calfee, Halter & Griswold LLP (57) ABSTRACT

An autonomous vehicle configured to perform a lane change maneuver is described herein. The autonomous vehicle includes several different types of sensor systems, such as image, lidar, radar, sonar, infrared, and GPS. The autonomous vehicle additionally includes a computing system that executes instructions on a lane change detection system and a control system. The lane change detection system includes a region of interest module and an object trajectory module for determining whether the autonomous vehicle will collide with another object if the autonomous vehicle maneuvers into an adjacent lane. An instruction module of the lane change detection system is further used to facilitate operational control of a mechanical system of the autonomous vehicle, such as an engine or a steering system.

20 Claims, 9 Drawing Sheets

(56) References Cited

U.S. PATENT DOCUMENTS

| | | | |
|---|---|---|---|
| 10,156,849 B1* | 12/2018 | Zych | G06Q 10/06315 |
| 10,345,810 B1* | 7/2019 | Zhu | G05D 1/0088 |
| 2002/0198632 A1* | 12/2002 | Breed | G08G 1/164 |
| | | | 701/1 |
| 2007/0080825 A1* | 4/2007 | Shiller | G08G 1/166 |
| | | | 340/903 |
| 2008/0046150 A1* | 2/2008 | Breed | B60R 21/0134 |
| | | | 701/45 |
| 2010/0023218 A1* | 1/2010 | Hayakawa | B60W 10/20 |
| | | | 701/42 |
| 2010/0082195 A1* | 4/2010 | Lee | B62D 15/025 |
| | | | 701/25 |
| 2014/0306833 A1* | 10/2014 | Ricci | H04W 4/44 |
| | | | 340/901 |
| 2014/0309789 A1* | 10/2014 | Ricci | H04W 4/40 |
| | | | 700/276 |
| 2014/0309864 A1* | 10/2014 | Ricci | A61B 7/04 |
| | | | 701/36 |
| 2015/0353082 A1* | 12/2015 | Lee | B60W 30/09 |
| | | | 701/41 |
| 2015/0353085 A1* | 12/2015 | Lee | B60W 30/10 |
| | | | 701/533 |
| 2016/0259334 A1* | 9/2016 | Hashimoto | G05D 1/0061 |
| 2017/0174261 A1* | 6/2017 | Micks | B62D 15/0265 |
| 2017/0345310 A1 | 11/2017 | Yoon | |
| 2018/0211117 A1* | 7/2018 | Ratti | G06K 9/00785 |
| 2018/0259957 A1* | 9/2018 | Charrow | B62D 15/025 |
| 2018/0284768 A1* | 10/2018 | Wilkinson | G05D 1/0221 |
| 2018/0284770 A1* | 10/2018 | VandenBerg, III | G08G 1/0112 |
| 2019/0235499 A1* | 8/2019 | Kazemi | B60W 30/0953 |
| 2019/0243371 A1* | 8/2019 | Nister | G05D 1/0278 |
| 2019/0317508 A1* | 10/2019 | Zhang | G08G 1/096775 |
| 2019/0333381 A1* | 10/2019 | Shalev-Shwartz | |
| | | | G06K 9/00791 |
| 2019/0355257 A1* | 11/2019 | Caldwell | G08G 1/0112 |

\* cited by examiner

LANE CHANGE DETECTION SYSTEM AND METHOD FOR AN AUTONOMOUS VEHICLE

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others, wherein the autonomous vehicle operates based upon sensor signals output by the sensor systems.

Traditional operation of an autonomous vehicle includes maneuvering the autonomous vehicle along a specified travel lane. In an exemplary embodiment, a processor receives sensor signals output by a sensor system and detects objects represented in the sensor signals, such as other vehicles, pedestrians, bikes, construction devices/equipment, or static objects. Based upon detection of an object in the travel lane by the processor, a control system executed by the processor can cause the processor to transmit control signals to mechanical system(s) of the autonomous vehicle, such as an engine, braking system, and/or steering system, such that the rate and/or direction of travel of the autonomous vehicle is controlled to avoid a collision with detected objects. Conventional maneuvers for object collision avoidance often rely on manipulating the vehicle's motion in the longitudinal direction of the travel lane (e.g., accelerating or decelerating the autonomous vehicle within the autonomous vehicle's current travel lane).

In some circumstances, an object such as a traffic cone or double-parked vehicle may introduce a blockage in the travel lane that will remain present for an extended length of time. In such situations it is not practical for the autonomous vehicle to wait for the blockage to be removed, thereby permitting the autonomous vehicle to continue its forward motion down the travel lane. Nonetheless, conventional manipulation of the vehicle's motion in the longitudinal direction of the travel lane is problematic under such conditions because it is insufficient to maneuver the autonomous vehicle around the blockage. Furthermore, lateral maneuvers that would require the vehicle to transition into an adjacent lane to circumvent the obstruction present a risk that the autonomous vehicle will collide with other objects as it transitions into the adjacent lane.

SUMMARY

The following is a brief summary of subject matter that is described in greater detail herein. This summary is not intended to be limiting as to the scope of the claims.

Described herein are various technologies pertaining to controlling the operation of an autonomous vehicle. With more specificity, described herein are various technologies pertaining to a lane change detection system for establishing whether an autonomous vehicle can transition from a source lane into a destination lane without colliding with other objects. With still more specificity, a lane change detection system is described herein that facilitates a lane change based on a region of interest defined in proximity to the autonomous vehicle, where the region of interest changes in both size and shape as a function of speed of the autonomous vehicle. In preferred embodiments, the size and shape of the region of interest are further defined by passenger comfort metrics intended to minimize "jerk" during the course of a lane change maneuver by the vehicle.

An exemplary autonomous vehicle includes a computing system having a processor and a memory, wherein the memory has a control system and a lane change detection system loaded therein that are executed by the processor. The autonomous vehicle additionally includes an engine, a steering system, a braking system, and at least one sensor system that are in communication with the computing system. The processor determines whether a lane change may be desirable based upon a sensor signal output by one or more of the vehicle's sensor systems, wherein the sensor signal output represents surroundings of the autonomous vehicle and/or operating parameters of the autonomous vehicle, such as geographic location of the autonomous vehicle, direction of movement of the autonomous vehicle, velocity of the autonomous vehicle, acceleration (or deceleration) of the autonomous vehicle, etc.). For example, if the sensor signal output indicates that a distance to an object is less than 9 meters and the speed of the autonomous vehicle is at least 4 m/s, the processor may execute the lane change detection system, wherein the lane change detection system is configured to determine whether present roadway conditions (and conditions of the autonomous vehicle) are suitable for the autonomous vehicle to perform a lane change.

The processor receives a signal output from the sensor system and the lane change detection system determines whether a left lane change or a right lane change is more desirable based on, for example, the signal output from the sensor system, the number of lanes in the road, whether an object is detected in a region of interest for a potential destination lane, route that the autonomous vehicle is travelling, etc. Once a left or right lane change has been initiated, the autonomous vehicle creeps toward an imaginary boundary along the source lane, referred to as the "stop wall", where the lane change detection system determines whether the autonomous vehicle should proceed all the way into the destination lane or abort the maneuver. The lane change detection system accounts for both objects that are currently occupying the region of interest as well as objects predicted to pass into/through the region of interest at a future point in time. If the processor determines that a collision will occur with an object in the destination lane when the autonomous vehicle crosses the stop wall, the maneuver is aborted and the autonomous vehicle remains in the source lane. Otherwise, the control system directs the autonomous vehicle to pass from the source lane over the stop wall and into the destination lane.

An exemplary lane change detection system is executed by the processor to initiate a lane change through simultaneous implementation of three distinct planning techniques. A first planning technique is used to detect objects in the source lane directly ahead of the autonomous vehicle and determine their relative distance. In certain embodiments, the first planning technique is reserved as a fallback for the lane change detection system in case a lane change maneuver needs to be aborted, thereby requiring the autonomous vehicle to remain positioned in the source lane. A second planning technique is directed to evaluating whether the region of interest is currently, or predicted to be, free of obstructions. The second planning technique requires consideration of three criteria: (1) whether an object is going to enter the region of interest; (2) what time the object is predicted to enter the region of interest; and (3) what time the object is predicted to exit the region of interest. This allows the lane change detection system to establish whether the autonomous vehicle will pass in front of or behind any cars or other objects located in the destination lane. A third planning technique is used to define maneuvers by the autonomous vehicle that will occur in the destination lane, such as the intended trajectory of the autonomous vehicle.

Defining a region of interest proximate to the autonomous vehicle and evaluating an object's relationship to that region increases the safety of autonomous vehicles by establishing an approach that provides improved confidence in lane changing. In an exemplary embodiment, the region of interest extends along the rear and side of the autonomous vehicle from the source lane into the destination lane. If another vehicle or object enters the region of interest, sensor system outputs may represent that the other vehicle/object is allowing the autonomous vehicle to merge in front of it into the destination lane. This model/scenario is referred to as the "nice guy observer". Nonetheless, without implementing a region of interest, the autonomous vehicle may otherwise need to project the length of the detected object/vehicle as occupying the entire width of the road, as if it were maintaining its speed alongside the autonomous vehicle. While this full road width assumption is sufficient to perform a lane change if a suitable longitudinal gap exists between the object in the destination lane and the autonomous vehicle in the source lane, it forecloses the possibility of changing lanes when a "nice guy observer" is in close proximity or adjacent to the autonomous vehicle and anticipating the autonomous vehicle to merge in front of it. As such, the lane change detection system facilitates assertive lane changes by considering variables applicable to the "nice guy observer" model.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a lane change system and method for operation of an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean serving as an illustration or example of something and is not intended to indicate a preference.

As used herein, the term "source lane" is intended to describe an avenue that an autonomous vehicle travels along prior to initiating a lane change maneuver. Moreover, the boundaries of the avenue that comprise the source lane are not limited to the same boundaries that define a conventional traffic lane.

As used herein, the term "destination lane" is intended to describe an avenue that an autonomous vehicle travels along upon completing a lane change maneuver. Moreover, the boundaries of the avenue that comprise the destination lane are not limited to the same boundaries that define a conventional traffic lane.

As used herein, the term "stop wall" is intended to describe an imaginary boundary line that separates the source lane from the destination lane. Likewise, the location of the stop wall is not limited to the location of a conventional centerline that divides a roadway.

Figure 1:
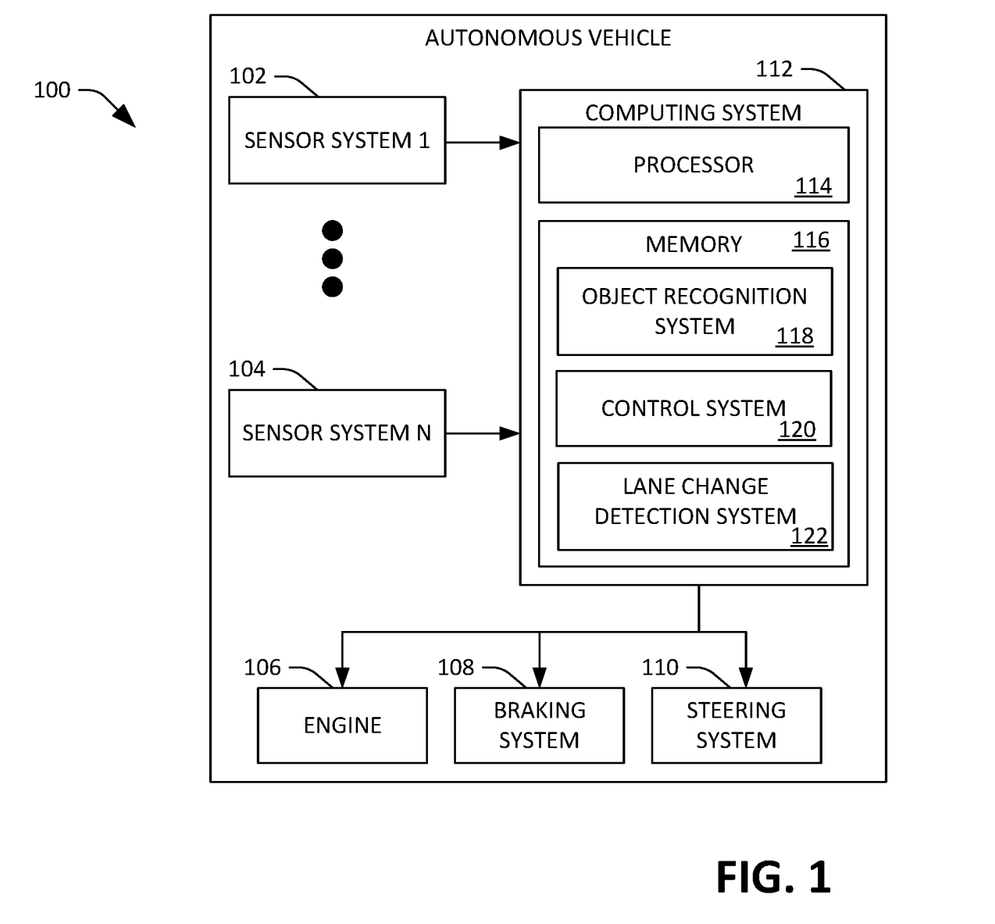
FIG. 1 illustrates an exemplary autonomous vehicle.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a lidar sensor system and the Nth sensor system 104 may be a camera (image) system. Other exemplary sensor systems include radar sensor systems, global positioning system (GPS) sensor systems, sonar sensor systems, infrared sensor systems, and the like.

Each sensor system in the plurality of sensor systems 102-104 may comprise multiple sensors. For example, the first sensor system 102 may comprise a first sensor, a second sensor, etc. Furthermore, some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

The autonomous vehicle 100 further includes several mechanical systems that are used to effectuate appropriate motion of the autonomous vehicle 100. For instance, the mechanical systems can include but are not limited to, an engine 106, a braking system 108, and a steering system 110. The engine 106 may be an electric engine or a combustion engine. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the engine 106, the braking system 108, and the steering system 110. The computing system 112 includes a processor 114 and a memory 116 that has computer-executable instructions which are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises an object recognition system 118 that is configured to assign labels to objects (in proximity to the autonomous vehicle 100) captured in sensor signals output by the sensor systems 102-104. These predefined types of objects can include, but are not limited to, pedestrian, bike, car, truck, bus, and static (unknown), where the type "static" can represent telephone poles, construction equipment, etc. In a specific example, the sensor systems 102-104 may include a radar sensor system. A radar sensor of the radar sensor system can emit a radio wave in a direction external to the autonomous vehicle 100. The radio wave may encounter an object and be reflected back towards the radar sensor, and the object recognition system 118 may assign a label to the object based upon the reflected radio wave.

The memory 116 further includes a lane change detection system loaded therein. The lane change detection system 122 is executed by the processor 114 when predetermined criteria are satisfied, such as a threshold speed of the autonomous vehicle 100 and/or a threshold distance to an object in the source lane. The processor 114 likewise executes a first set of instructions to prioritize whether a left lane change or a right lane change is more desirable in view of data such as the number of lanes in the road, a next desired exit or turn, whether an object is detected in or predicted to occupy the region of interest, and other similar criteria. If the processor 114 determines that the autonomous vehicle 100 cannot be maneuvered into the lane that is given priority, the processor 114 executes a second set of instructions to determine whether it is still desirable for the autonomous vehicle 100 to pursue a second option of maneuvering into the lane of lesser priority. If a lane change is desirable, the lane change detection system 122 is executed to define a region of interest proximate to the autonomous vehicle 100 (either directed toward the left or right side of the autonomous vehicle, depending on the intended lane change direction) and determine whether it is safe to maneuver the autonomous vehicle 100 into the destination lane based on sensor signal outputs received from the sensor systems 102-104.

Additionally, the memory 116 includes a control system 120 that is executed based on instructions from the object recognition system 118 and the lane change detection system 122 and is further configured to facilitate control of at least one of the mechanical systems (e.g., the engine 106, the brake system 108, or the steering system 110). In some embodiments, the object recognition system 118 may enhance the accuracy of an output generated according to the lane change detection system 122 by improving trajectory predictions for other objects.

Figure 2:
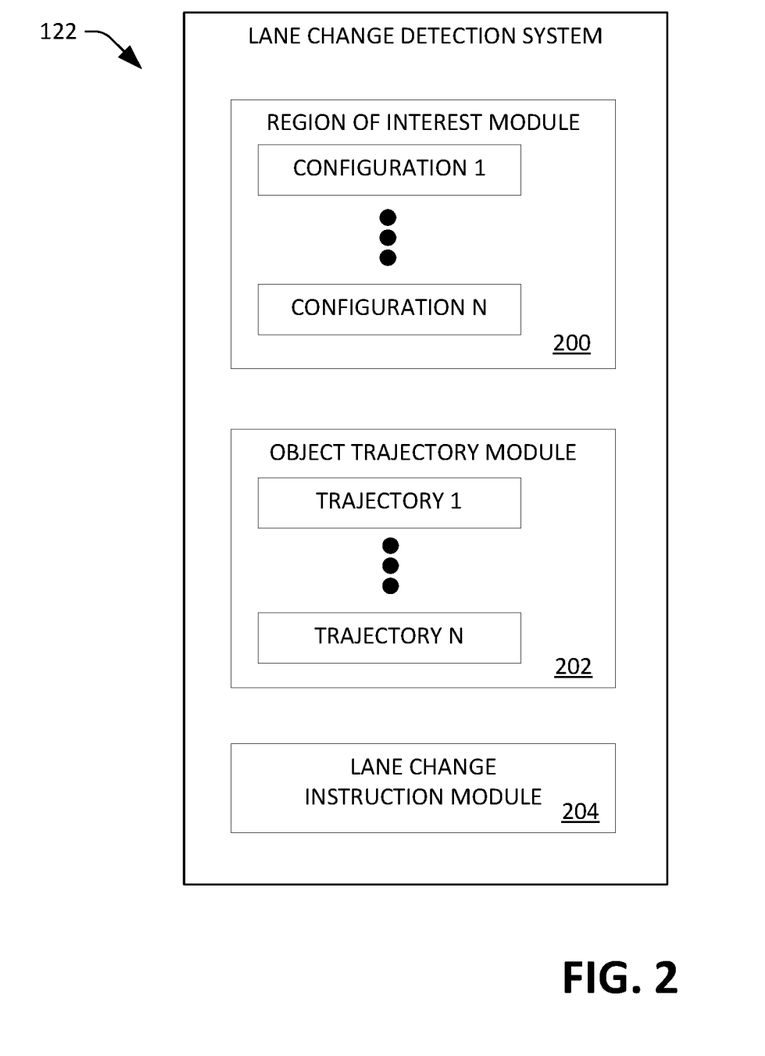
FIG. 2 is a functional block diagram of an exemplary lane change detection system included within an autonomous vehicle.

With reference now to FIG. 2, an exemplary lane change detection system 122 included within an autonomous vehicle 100 is illustrated. The lane change detection system 122 comprises a region of interest module 200 to define a configuration for the region of interest. The size and shape of a particular region of interest is dynamic in that the ultimate configuration is dependent upon certain variables, for example, the speed of the autonomous vehicle 100. Thus, the region of interest module 200 may facilitate generation of a number of different configurations for various regions of interest (e.g., Configuration 1 through Configuration N) based upon the particular conditions detected by the sensor systems 102-104 in connection with an intended lane change. In defining a configuration for the region of interest, the region of interest module 200 likewise accounts for passenger comfort metrics. These metrics comprise predetermined data that indicate whether a typical passenger is expected to experience discomfort during the course of a maneuver. If a region of interest configuration is predicted to promote a maneuver by the autonomous vehicle 100 that would result in at least a threshold level of passenger discomfort, the configuration is excluded as a candidate by the region of interest module 200.

Once a configuration for the region of interest is defined by the region of interest module 200 for a specific set of conditions, the processor 112 is provided with information to determine whether an object has been detected in the destination lane. The information may be received, for example, from the lane change detection system 122, the object recognition system 118, or directly from the sensor systems 102-104. The lane change detection system 122 then facilitates determination of the location of the object relative to the region of interest and defines an expected trajectory for the object using an object trajectory module 202. The expected trajectory may indicate that an object will remain within the region of interest, remain outside the region of interest, or is anticipated to pass into/through the region of interest.

The object trajectory module 202 may also define trajectories for more than one detected objects simultaneously to provide a Trajectory 1 through a Trajectory N. Establishing the trajectories of multiple objects is beneficial, for example, when a first vehicle intends to advance through the region of interest and bypass the autonomous vehicle 100 but a second vehicle intends to stop within the region of interest to allow the autonomous vehicle 100 to merge in front of it into the destination lane. Furthermore, since the trajectories of some objects such as other driver-operated vehicles are subject to change, the predicted trajectory of an object is recalculated at periodic intervals using the object trajectory module 202 to determine whether a previous collision determination has changed/updated, thereby providing a need to abort or initiate a maneuver by the autonomous vehicle 100.

The determination of whether to proceed with a lane change is determined by executing a lane change instruction module 204. If the configuration defined by the region of interest module 200 would promote a collision for the autonomous vehicle 100 when combined with the expected trajectory of a detected object, the lane change instruction module 204 will provide non-lane change instructions (i.e., instructions for the autonomous vehicle 100 to remain in its current lane of travel). Otherwise, the lane change instruction module 204 will provide instructions to perform a lane change. An output based on the lane change detection system 122 is provided to the control system 120 where the instructions provided by the lane change instruction module 204 are implemented for operation of the autonomous vehicle.

Figure 3:
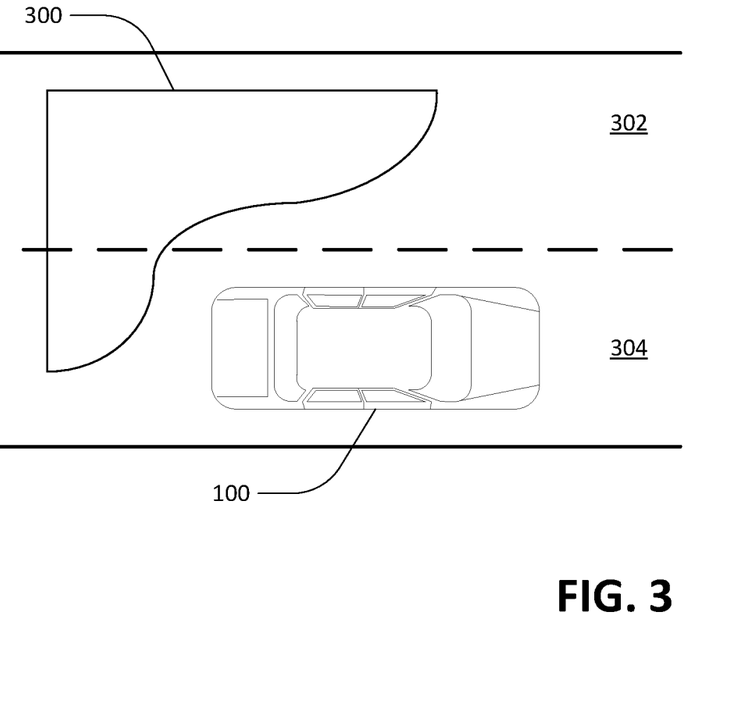
FIG. 3 illustrates an overhead view of an exemplary region of interest defined by an autonomous vehicle.
Figure 4:
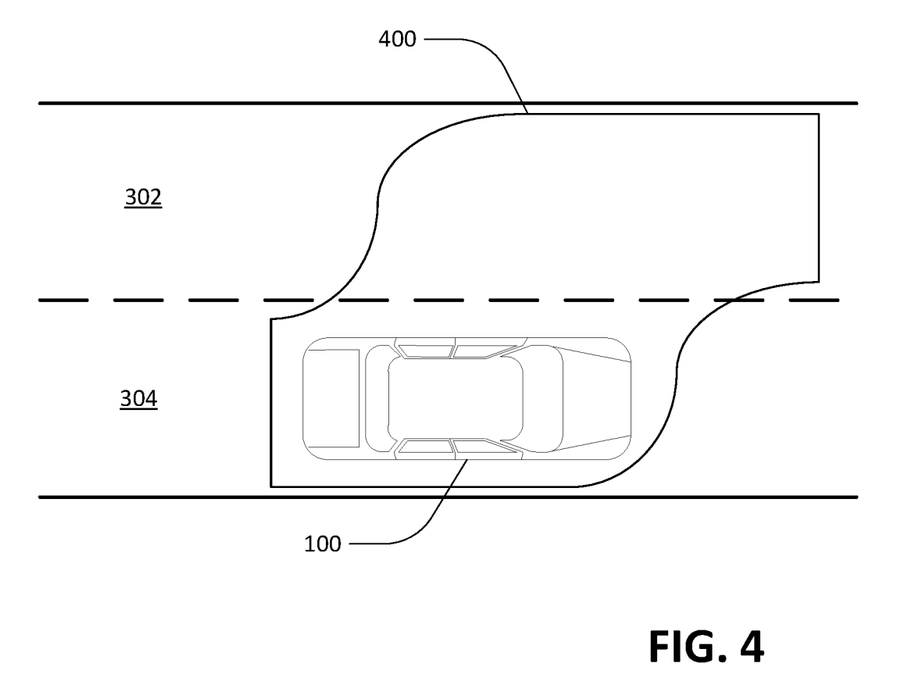
FIG. 4 illustrates an overhead view of an exemplary region of interest defined by an autonomous vehicle.

Referring now to FIGS. 3 and 4, exemplary regions of interest 300-400 are defined in proximity to the autonomous vehicle 100. The region of interest may be a grand piano-shaped region of interest 300 disposed along the rear and side of the autonomous vehicle 100 or it may be configured as an "S"-shaped region of interest 400 that encompasses the autonomous vehicle 100 and extends into the destination lane 302.

In an exemplary embodiment, the region of interest 300 extends along the rear and side of the autonomous vehicle 100 from the source lane 304 into the destination lane 302. As noted previously, the curvature of the region of interest 300-400 is dependent upon variables such as speed of the autonomous vehicle and passenger comfort metrics. These variables also impact the size of the regions of interest 300-400, which may be extended or compressed, specifically in the longitudinal direction of a roadway. In the lateral direction, the regions of interest 300-400, may extend across both the source lane 304 and the destination lane 302 or, in some embodiments, may be confined to just the destination lane 302.

The outside constraint and the rear constraint forming the region of interest 300 are generally projected as straight lines having a perpendicular orientation to one another, whereas the forward constraint and the rear constraint of the region of interest 400 are projected as straight lines having a parallel orientation to one another. Straight line boundaries forming the region of interest, particularly with respect to the rear constraint, generally indicate a threshold distance at which an object beyond the boundary is not expected to interfere with a lane change at the time a lane change maneuver is being performed by the autonomous vehicle 100. However, when an object is either already positioned in the regions of interest 300-400 or is anticipated to pass through the regions of interest 300-400 before the lane change maneuver is initiated, the trajectory of the object must be established before the autonomous vehicle 100 can safely transition from the source lane 304 to the destination lane 302.

Figure 5:
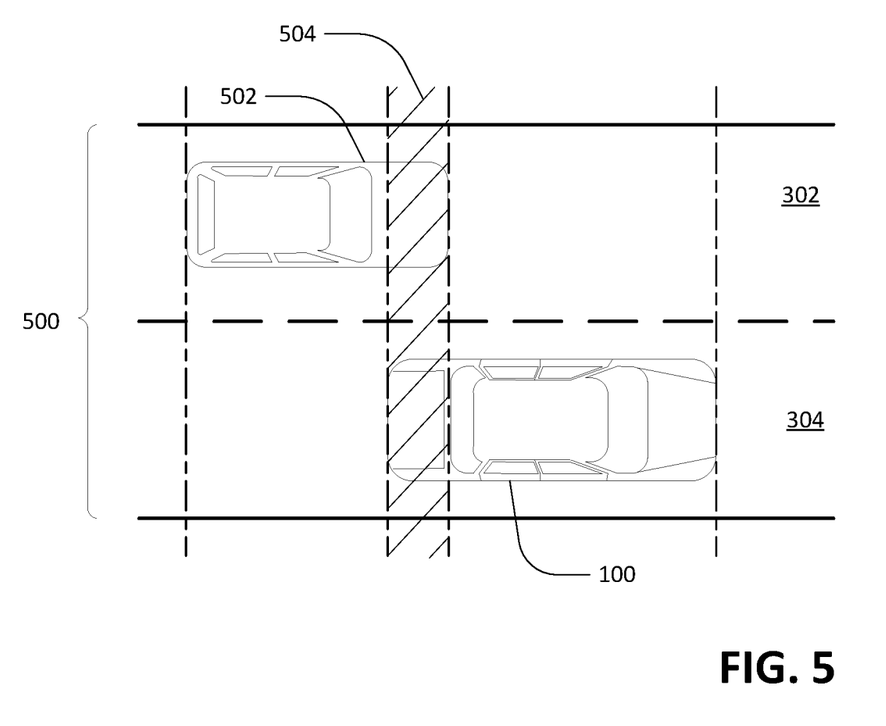
FIG. 5 illustrates an overhead view of an exemplary full road-width projection by an autonomous vehicle.
Figure 6:
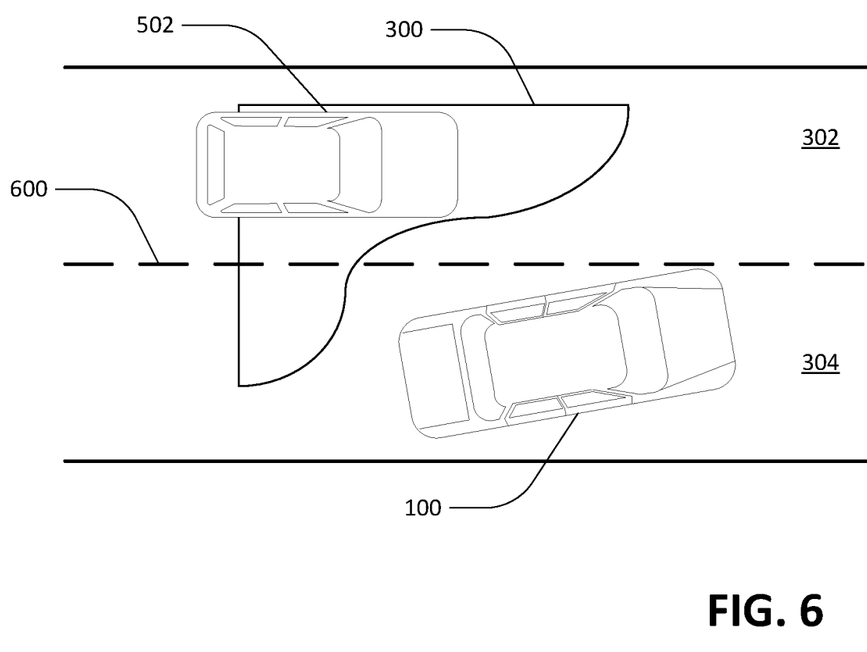
FIG. 6 illustrates an overhead view of an autonomous vehicle performing a lane change maneuver while a driver-operated vehicle is disposed adjacent to the autonomous vehicle.

Turning now to FIGS. 5 and 6, certain situations are depicted where another object, such as a driver-operated vehicle 502, may reduce its speed to allow the autonomous vehicle 100 to merge in front of it into the destination lane 302. This set of conditions is referred to as the "nice guy observer" model/scenario. A comparison of FIGS. 5 and 6 illustrate how a region of interest 300 accounts for a driver-operated "nice guy observer" vehicle 502 (FIG. 6) and how a lane change maneuver is alternatively affected by the "nice guy observer" when no region of interest 300 is defined and only a full road-width projection 500 is used (FIG. 5).

Referring to FIG. 5, without defining a region of interest 300-400, a lane change maneuver may be performed by projecting the length of both the autonomous vehicle 100 and the driver-operated vehicle 502 as occupying the entire width of the road, for example, projecting the vehicles (100, 502) across both the source lane 304 and the destination lane 302. In order to perform a lane change based upon a full road-width projection 500, the autonomous vehicle 100 and the driver-operated vehicle 502 cannot have an overlapped region 504. In the exemplary embodiment, each vehicle (100, 502) must at a minimum occupy its own separate full-width section of the roadway before the autonomous vehicle 100 will initiate a lane change maneuver.

While the exemplary embodiment illustrates the boundaries of the overlapped region 504 as aligning with the front of the driver-operated vehicle 502 and the rear of the autonomous vehicle 100, it is to be understood that other embodiments require the front and rear constraints to include a longitudinal gap between the above-mentioned constraints and an end of the vehicles (100, 502). This gapped region may, for example, require there to be a significant distance between the rear of the autonomous vehicle 100 and the front of the driver-operated vehicle 502 before the autonomous vehicle 100 is able to safely initiate a lane change maneuver.

FIG. 6 depicts an alternative method to the full road-width projection 500 by implementing a region of interest 300 to perform a lane change. Specifically, the region of interest 300 facilitates an assertive lane change because it provides a way for the autonomous vehicle to perform a lane change maneuver even when vehicle projections from the full-road width technique 500 would otherwise overlap. Similar to the methodology illustrated in FIG. 5, the autonomous vehicle 100 detects that a projected forward end of the driver-operated vehicle 502 overlaps a projected rearward end of the autonomous vehicle 100. In contrast to the method illustrated in FIG. 5, however, the option to perform a lane change maneuver according to the methodology illustrated in FIG. 6 is not necessarily foreclosed.

Instead, the autonomous vehicle 100 defines a region of interest 300 to evaluate the trajectory of objects, such as a driver-operated vehicle 502, with respect to the region of interest 300. If the autonomous vehicle 100 determines that the driver-operated vehicle 502 conforms to the "nice guy observer" model, the autonomous vehicle 100 angles itself to approach a "stop wall" 600. The stop wall 600 generally aligns with a boundary line between the source lane 304 and the destination lane 302, for example, a centerline of the roadway. However, the stop wall 600 is not limited to this location and may be projected to pass through any number of laterally positioned points along the source lane 304 and the destination lane 302. At the stop wall 600, the autonomous vehicle 100 again performs a verification that the driver-operated vehicle 502 is in fact a "nice guy observer" via at least one further processing step that provides an updated trajectory for the driver-operated vehicle 502. Upon verification, the autonomous vehicle 100 plots its own trajectory into the destination lane 302 and performs a lane change maneuver.

Figure 7:
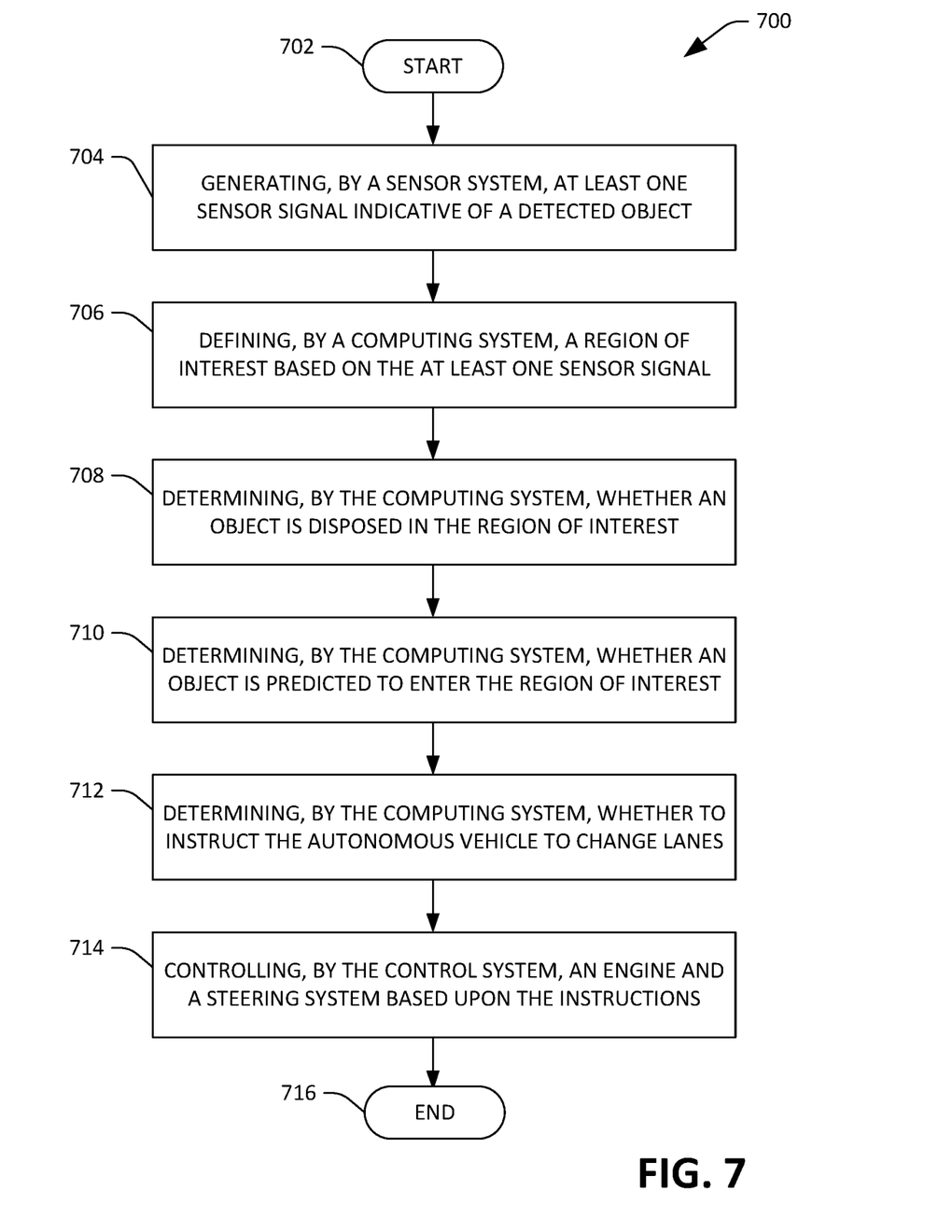
FIG. 7 is a flow diagram illustrating an exemplary methodology for controlling lane change maneuvers by an autonomous vehicle.
Figure 8:
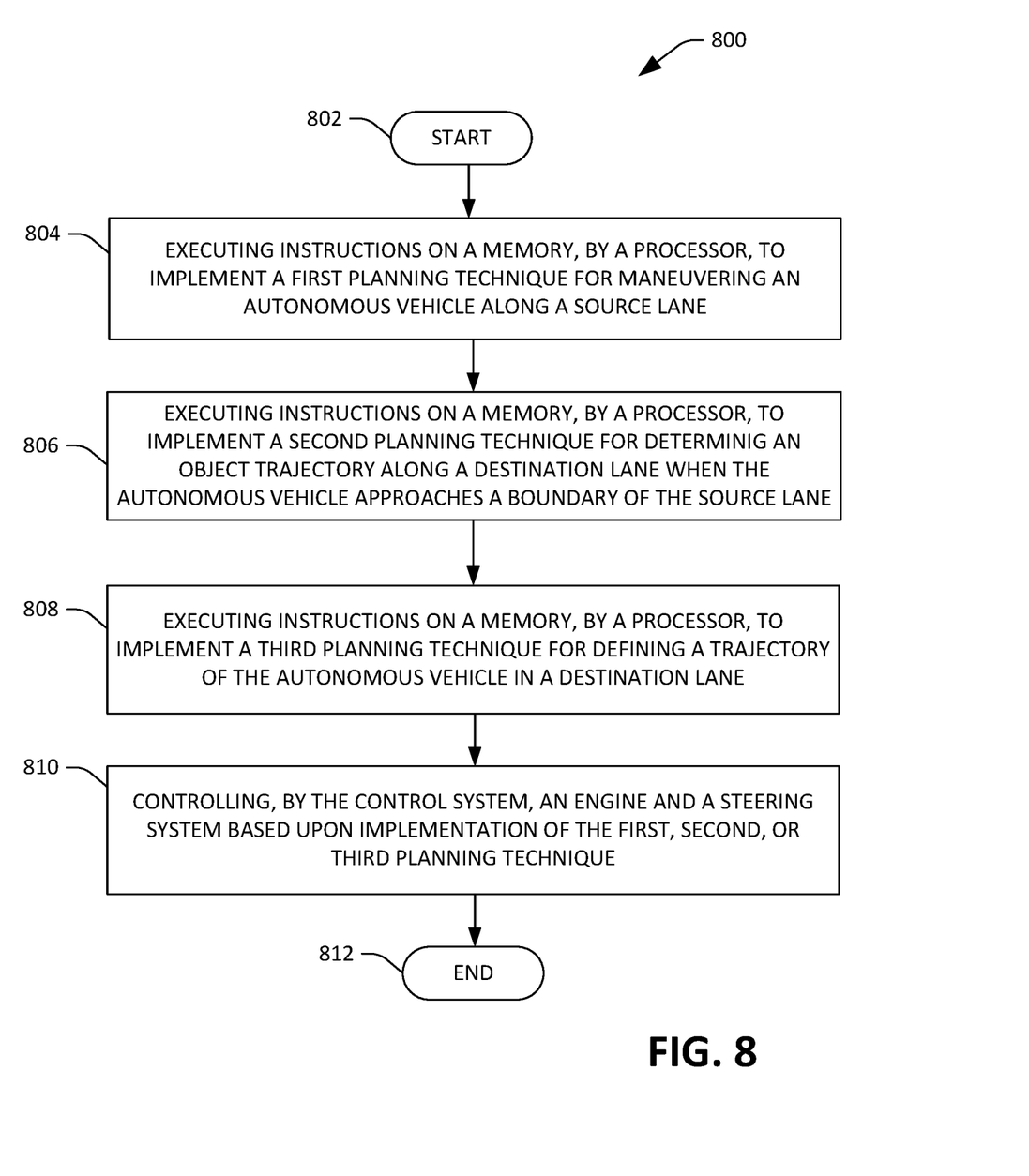
FIG. 8 is a flow diagram illustrating a plurality of planning techniques for controlling lane change maneuvers by an autonomous vehicle.

FIGS. 7 and 8 illustrate exemplary methodologies relating to controlling an autonomous vehicle, particularly with respect to performing a lane change maneuver. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for controlling operation of an autonomous vehicle is illustrated. The methodology 700 starts at 702, and at 704 at least one sensor signal is generated by a sensor system that captures whether an object has been detected in proximity (e.g., within 300 feet) of the autonomous vehicle. At 706, a computing system defines a region of interest based on the at least one sensor signal, wherein the region of interest is at least partially projected into a destination lane adjacent to the autonomous vehicle. At 708, the computing system determines whether an object is disposed in the region of interest and at 710, the computing system further determines whether an object is predicted to enter the region of interest. The computing system may generate a confidence score based on data received from the at least one sensor signal to determine an expected trajectory for the object.

At 712, the computing system determines whether to instruct the autonomous vehicle to change lanes or to remain in the source lane. For example, if the expected trajectory of the object is determined to result in a collision with the autonomous vehicle, the computing system will generate instructions for the autonomous vehicle to remain in the current travel lane/abort the lane change maneuver. Otherwise, the computing system will generate instructions for the autonomous vehicle to maneuver into the destination lane. At 714, a mechanical system of the autonomous vehicle is controlled by the control system based upon the instructions from the computing system. The mechanical system may be one of an engine, a braking system, or a steering system. The methodology 700 completes at 616.

Referring now to FIG. 8, an exemplary methodology 800 incorporating a plurality of planning techniques to facilitate a lane change maneuver is illustrated. The methodology 800 starts at 802, and at 804 a processor executes instructions on a memory to implement a first planning technique for maneuvering an autonomous vehicle along a source lane. The first planning technique, for instance, may provide instructions for the computing system to revert to in the event a lane change maneuver is aborted. At 806, the processor executes instructions on the memory to implement a second planning technique for determining an object trajectory along a destination lane when the autonomous vehicle approaches a boundary/stop wall of the source lane. The evaluation may include, for example, compensating for changes in an updated trajectory of a detected object in the destination lane based on a verification signal from the sensor system. At 808, the processor executes instructions on the memory to implement a third planning technique for defining a trajectory of the autonomous vehicle in the destination lane. At 810, a mechanical system of the autonomous vehicle is controlled by the control system based upon implementation of the first, second, or third planning techniques. The mechanical system may be one of an engine, a braking system, or a steering system. The methodology 800 completes at 812.

Figure 9:
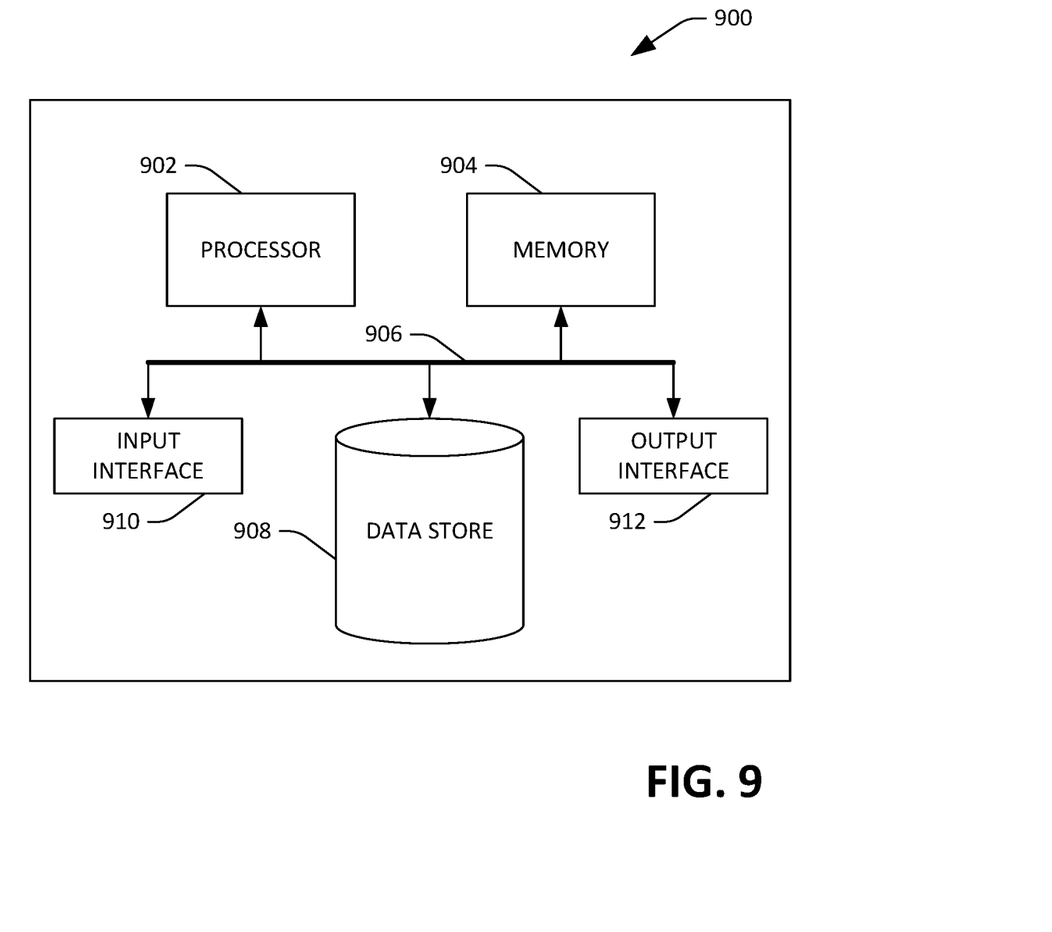
FIG. 9 illustrates an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 112. The computing device 900 includes at least one processor 902 that executes instructions that are stored in a memory 904. The instructions may be, for instance, instructions for implementing functionality described as being carried out by one or more modules and systems discussed above or instructions for implementing one or more of the methods described above. The processor 902 may be a GPU, a plurality of GPUs, a multi-core processor, etc. The processor 902 may access the memory 904 by way of a system bus 906. In addition to storing executable instructions, the memory 904 may also store confidence scores, prior probability data, sensor data, training data, etc.

The computing device 900 additionally includes a data store 908 that is accessible by the processor 902 by way of the system bus 906. The data store 908 may include executable instructions, sensor data, probability data, training data, confidence scores, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the engine 106, the braking system 108, and/or the steering system 110 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle that is travelling in a direction in a first lane of a roadway, the autonomous vehicle comprising:
    a motor;
    a steering system;
    a sensor system that generates a sensor signal;
    a computing system in communication with the motor, the steering system, and the sensor system, wherein the computing system comprises:
        a processor; and
        memory that stores instructions that, when executed by the processor, cause the computing system to perform acts comprising:
            determining that the autonomous vehicle is to maneuver into a second lane of the roadway that is adjacent to the first lane of the roadway, wherein traffic in the second lane flows in the direction in which the autonomous vehicle is travelling;
            defining a region of interest based on the sensor signal, wherein the region of interest encompasses a portion of the second lane of the roadway, and further wherein the region of interest encompasses an area that is beside and behind the autonomous vehicle with respect to the direction that the autonomous vehicle is travelling;
            detecting that a vehicle is at least partially within the region of interest, wherein the vehicle is travelling in the direction in the second lane, and further wherein a portion of the vehicle is in a portion of the area encompassed by the region of interest that is beside the autonomous vehicle;
            inferring that the autonomous vehicle is able to exit the first lane of the roadway and enter the second lane of the roadway despite the vehicle being detected as being at least partially within the region of interest, wherein inferring that the autonomous vehicle is able to exit the first lane comprises:
                detecting that the vehicle in the second has made a speed change slowing down;
                controlling the motor and the steering system to cause the autonomous vehicle to maneuver to a laterally positioned point along the first lane and the second lane; and
                detecting a trajectory of the vehicle when the autonomous vehicle is at the laterally positioned point; and
            controlling the motor and the steering system to cause the autonomous vehicle to maneuver into the second lane in response to inferring that the autonomous vehicle is able to exit the first lane of the roadway and enter the second lane of the roadway.

2. The autonomous vehicle of claim 1, wherein the instructions are executed by the processor when predetermined criteria is satisfied.

3. The autonomous vehicle of claim 1, wherein the computing system determines that the autonomous vehicle is to maneuver into the second lane rather than a third lane that is also adjacent the first lane based on a next turn to be taken by the autonomous vehicle or a number of lanes in the roadway.

4. The autonomous vehicle of claim 1, wherein a size and shape of the region of interest are defined based upon speed of the autonomous vehicle.

5. The autonomous vehicle of claim 1, wherein a size and shape of the region of interest are defined according to predetermined passenger comfort metrics.

6. The autonomous vehicle of claim 1, wherein the motor is an electric motor.

7. The autonomous vehicle of claim 1, the acts further comprising:
    determining, based upon the sensor signal, that the vehicle is expected to remain in the region of interest for an amount of time, wherein inferring that the autonomous vehicle is able to exit the first lane of the roadway and enter the second lane of the roadway despite the vehicle being detected as being at least partially within the region of interest is based upon the determination that the vehicle is expected to remain in the region of interest for the amount of time.

8. A method performed by a processor of a computing system of an autonomous vehicle, wherein the autonomous vehicle is travelling in a direction in a first lane of a roadway, the method comprising:
    determining that the autonomous vehicle is to maneuver into a second lane of the roadway that is adjacent to the first lane of the roadway, wherein traffic in the second lane of the roadway flows in the direction in which the autonomous vehicle is travelling;
    defining a region of interest based on a sensor signal output by a sensor system of the autonomous vehicle, wherein the region of interest encompasses a portion of the second lane of the roadway, and further wherein the region of interest encompasses an area that is beside and behind the autonomous vehicle with respect to the direction that the autonomous vehicle is travelling;
    detecting that a vehicle is at least partially within the region of interest, wherein the vehicle is travelling in the direction in the second lane, and further wherein a portion of the vehicle is in a portion of the area encompassed by the region of interest that is beside the autonomous vehicle;
inferring that the autonomous vehicle is able to maneuver into the second lane without colliding with the vehicle despite the vehicle being detected as being at least partially within the region of interest, wherein inferring that the autonomous vehicle is able to exit the first lane comprises:
detecting that the vehicle in the second lane has made a speed change slowing down;
controlling the motor and the steering system to cause the autonomous vehicle to maneuver to a laterally positioned point along the first lane and the second lane; and
detecting a trajectory of the vehicle when the autonomous vehicle is at the laterally positioned point; and
controlling a motor and a steering system of the autonomous vehicle to cause the autonomous vehicle to maneuver into the second lane in response to inferring that the autonomous vehicle is able to maneuver into the second lane.

9. The method of claim 8, wherein steps of defining, detecting, inferring, and controlling are performed only when predetermined criteria is satisfied.

10. The method of claim 8, further comprising:
determining that the autonomous vehicle is to maneuver into the second lane rather than a third lane that is also adjacent the first lane is based on a next turn to be taken by the autonomous vehicle.

11. The method of claim 8, wherein a size and shape of the region of interest are defined based upon a detected speed of the autonomous vehicle.

12. The method of claim 8, wherein a size and shape of the region of interest are defined according to predetermined passenger comfort metrics.

13. The method of claim 8, further comprising:
determining, based upon the sensor signal, that the vehicle is expected to remain in the region of interest for an amount of time, wherein inferring that the autonomous vehicle is able to maneuver into the second lane is based upon the determination that the vehicle is expected to remain in the region of interest for the amount of time.

14. An autonomous vehicle that is travelling in a direction in a first lane of a roadway, wherein the autonomous vehicle comprises a computer-readable storage medium that stores instructions that, when executed by a processor of the autonomous vehicle, causes the processor to perform acts comprising:
determining that the autonomous vehicle is to maneuver into a second lane of the roadway that is adjacent to the first lane of the roadway, wherein traffic in the second lane of the roadway flows in the direction in which the autonomous vehicle is travelling;
defining a region of interest based on a sensor signal output by a sensor system of the autonomous vehicle, wherein the region of interest encompasses a portion of the second lane of the roadway, and further wherein the region of interest encompasses an area that is beside and behind the autonomous vehicle with respect to the direction that the autonomous vehicle is travelling;
detecting that a vehicle is at least partially within the region of interest, wherein the vehicle is travelling in the direction in the second lane, and further wherein a portion of the vehicle is in a portion of the area encompassed by the region of interest that is beside the autonomous vehicle;
determining that the autonomous vehicle is able to maneuver into the second lane without colliding with the vehicle despite the vehicle being detected as being at least partially within the region of interest, wherein determining that the autonomous vehicle is able to maneuver into the second lane comprises:
detecting that the vehicle in the second lane has made a speed change slowing down;
controlling the motor and the steering system to cause the autonomous vehicle to maneuver to a laterally positioned point along the first lane and the second lane; and
detecting a trajectory of the vehicle when the autonomous vehicle is at the laterally positioned point; and
controlling a motor and a steering system of the autonomous vehicle to cause the autonomous vehicle to maneuver into the second lane in response to determining that the autonomous vehicle is able to maneuver into the second lane.

15. The autonomous vehicle of claim 14, wherein acts of defining, detecting, determining, and controlling are performed only when predetermined criteria is satisfied.

16. The autonomous vehicle of claim 14, the acts further comprising:
determining that the autonomous vehicle is to maneuver into the second lane rather than a third lane that is also adjacent the first lane is based on a next turn to be taken by the autonomous vehicle.

17. The autonomous vehicle of claim 14, wherein a size and shape of the region of interest are defined based upon a detected speed of the autonomous vehicle.

18. The autonomous vehicle of claim 14, the acts further comprising:
determining, based upon the sensor signal, that the vehicle is expected to remain in the region of interest for an amount of time, wherein inferring that the autonomous vehicle is able to exit the first lane of the roadway and enter the second lane of the roadway despite the vehicle being detected as being at least partially within the region of interest is based upon the determination that the vehicle is expected to remain in the region of interest for the amount of time.

19. The autonomous vehicle of claim 14, wherein a size and shape of the region of interest are defined according to predetermined passenger comfort metrics.

20. The autonomous vehicle of claim 14, wherein the motor is an electric motor.

\* \* \* \* \*